(12) United States Patent
Raines et al.

(10) Patent No.: US 8,973,942 B1
(45) Date of Patent: Mar. 10, 2015

(54) ACTIVE BOLSTER WITH INTEGRATED VENT

(71) Applicant: Ford Global Technologies, LLC, Dearborn, MI (US)

(72) Inventors: Stacey H. Raines, Ypsilanti, MI (US); Sean B. West, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 53 days.

(21) Appl. No.: 13/975,999

(22) Filed: Aug. 26, 2013

(51) Int. Cl.
- B60R 21/04 (2006.01)
- B60R 21/239 (2006.01)
- B60R 21/276 (2006.01)
- B60R 21/02 (2006.01)

(52) U.S. Cl.
CPC ............. *B60R 21/239* (2013.01); *B60R 21/276* (2013.01); *B60R 2021/0273* (2013.01)
USPC ............................ 280/753; 280/751; 280/739

(58) Field of Classification Search
CPC ........................... B60R 21/279; B60R 21/276
USPC .......................................... 280/739, 751, 753
See application file for complete search history.

(56) References Cited

U.S. PATENT DOCUMENTS

| | | | | |
|---|---|---|---|---|
| 5,725,244 | A * | 3/1998 | Cundill | 280/739 |
| 6,213,497 | B1 * | 4/2001 | Spencer et al. | 280/730.1 |
| 6,799,777 | B2 * | 10/2004 | Hawthorn et al. | 280/742 |
| 7,878,532 | B2 | 2/2011 | Sasaki et al. | |
| 8,308,189 | B2 | 11/2012 | Matsushima et al. | |
| 8,328,233 | B2 | 12/2012 | Kalisz | |
| 8,454,054 | B1 * | 6/2013 | Raines | 280/753 |
| 8,459,689 | B2 * | 6/2013 | Roychoudhury | 280/730.1 |
| 2005/0023802 | A1 * | 2/2005 | Enders et al. | 280/728.2 |
| 2009/0250915 | A1 * | 10/2009 | Best et al. | 280/742 |

* cited by examiner

*Primary Examiner* — Nicole Verley
(74) *Attorney, Agent, or Firm* — Vichit Chea; MacMillan, Sobanski & Todd, LLC

(57) ABSTRACT

An active bolster mounts at an interior trim surface of a passenger compartment in an automotive vehicle. A plastic-molded, expandable front wall deploys toward a passenger in the passenger compartment. A plastic-molded back wall is joined around a substantially sealed perimeter with the front wall to form an inflatable bladder. The back wall includes an inflator receptacle defined by a raised recess wall having an inflator aperture. An inflator with a gas outlet end and an electrical connector end is received in the inflator aperture with the gas outlet end inside the inflatable bladder. The recess wall has a predetermined thickness for substantially retaining shape during inflation of the bladder. The inflator receptacle includes a flexible seal disposed around an inner edge of the inflator aperture comprised of a flashing edge bearing against the inflator and having a thickness less than the predetermined thickness of the recess wall.

9 Claims, 3 Drawing Sheets

ACTIVE BOLSTER WITH INTEGRATED VENT

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant crash protection in automotive vehicles, and, more specifically, to an active bolster with an inflatable bladder formed by plastic wall panels that is vented to manage deflation during impact.

An active bolster is a vehicle occupant protection device with a gas-inflatable bladder to absorb impacts and reduce trauma to occupants during a crash. As opposed to deployable air bag cushions made of various fabrics that emerge from behind various openings upon inflation, active bolsters use the interior trim surface itself to expand at the beginning of a crash event for absorbing the impact and dissipating energy through the action of an inflation gas. U.S. Pat. No. 8,205,909, issued Jun. 26, 2012, incorporated herein by reference, discloses an active knee bolster integrated into a glove box door that is light weight and visually attractive. U.S. Pat. No. 8,474,868, issued Jul. 2, 2013, also incorporated herein by reference, discloses a typical structure wherein an active bolster includes a front wall or panel (i.e., a trim panel) that faces a vehicle occupant attached to a back wall or panel (i.e., bladder wall) along a sealed periphery. One or both of the walls is deformable in order to provide an inflatable bladder. For example, the back wall may have a pleated (i.e., accordion-like) region that straightens out during inflation. The walls are initially spaced apart by a small amount when in their pre-deployment, non-inflated condition. This allows ingress of the inflation gas in a manner that achieves an even inflation across the panel.

The front and back walls of a typical bladder for an active bolster are comprised of molded thermoplastics such as polyethylene, polyolefin, or PVC. They are typically injection molded but can also be blow molded. When formed separately, the front and back walls must be hermetically joined around their periphery in order to form the inflatable bladder. The joint must be strong to resist separation that could result from the high pressures during inflation. The peripheral seal is formed by hot welding, for example.

It is known that in order to optimize the dissipation of energy when an occupant contacts an air bag or an active bolster, inflation gas should be vented to allow a controlled collapse of the airbag that safely decelerates the impacting occupant. U.S. Pat. No. 8,328,233, issued Dec. 11, 2012, which is incorporated herein by reference, discloses a variable vent for an active bolster wherein the vent has a low flow rate at low pressures and a higher flow rate at higher pressures across the vent. The reduced flow rate of the vent during initial stages of inflation permits the use of a smaller (less costly) inflator, while the higher vent flow rate at higher pressures helps ensure the integrity of the peripheral weld by limiting the pressure rise and avoiding large tearing forces that could cause the seal to fail.

Various types of structures have been disclosed for venting an adaptive amount of inflation gas during inflation and during loading by an impacting passenger. For example, hinged flaps providing a small opening at low pressure and a larger opening at higher pressure have been formed in the back bladder wall. The size, placement, and desired performance characteristics for an active bladder are typically unique for each vehicle model that is developed by a vehicle manufacturer. Since the bladder wall may be redesigned for each new vehicle design, a significant development effort must be is devoted to finding an appropriate placement and configuration for one or more vent features according to the unique design specifications. It would be desirable to provide a venting structure that is usable across many different designs and that reliably provides an appropriate amount of venting (including no venting, i.e., a sealed condition) at the appropriate times.

SUMMARY OF THE INVENTION

In one aspect of the invention, an active bolster is provided for mounting at an interior trim surface of a passenger compartment in an automotive vehicle. A plastic-molded, expandable front wall deploys toward a passenger in the passenger compartment. A plastic-molded back wall is joined around a substantially sealed perimeter with the front wall to form an inflatable bladder. The back wall includes an inflator receptacle defined by a raised recess wall having an inflator aperture. An inflator with a gas outlet end and an electrical connector end is received in the inflator aperture with the gas outlet end inside the inflatable bladder. The recess wall has a predetermined thickness for substantially retaining shape during inflation of the bladder. The inflator receptacle includes a flexible seal disposed around an inner edge of the inflator aperture comprised of a flashing edge bearing against the inflator and having a thickness less than the predetermined thickness of the recess wall to form a variable vent.

DETAILED DESCRIPTION OF PREFERRED EMBODIMENTS

Figure 1:
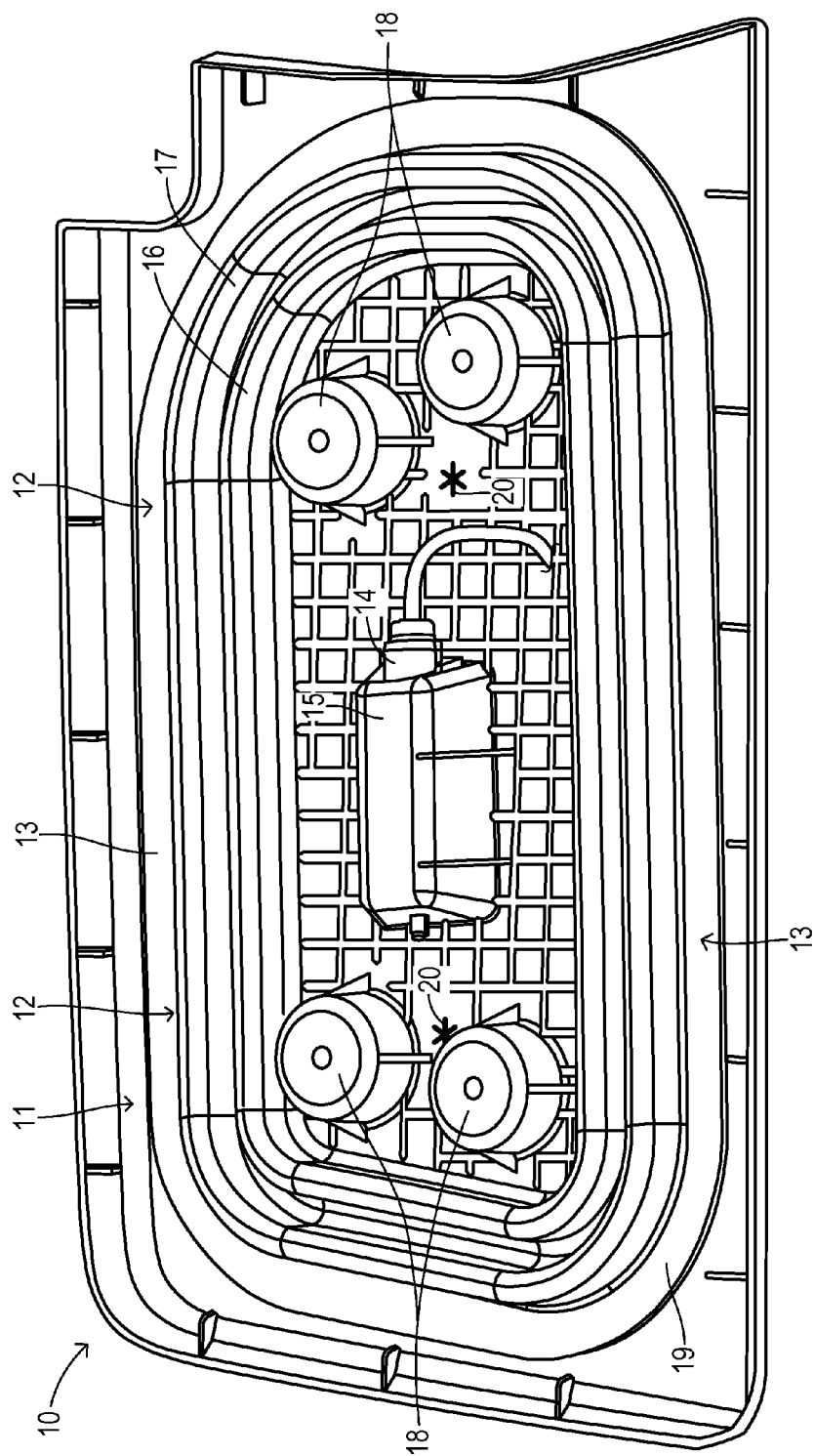
FIG. 1 is a rear perspective view of a prior art inflatable bladder assembly of an active bolster.

Referring now to FIG. 1, an inflatable bladder 10 for an active bolster has a plastic-molded front wall 11 and a plastic-molded, expandable back bladder wall 12. Walls 11 and 12 are joined around a closed perimeter region 13 to form an inflatable bladder having an open central volume or cavity between walls 11 and 12 to receive an inflation gas from an inflator 14 mounted in a receptacle or recess 15 of back wall 12 during a crash event. Back wall 12 includes a plurality of pleats, such as 16 and 17, to accommodate the expansion of back wall 12 during inflation. A plurality of bosses 18 are used to mount back wall 12 to a reaction surface. Vent holes 20 comprised of an asterisk-shaped pattern cut through inner wall 12 are used for venting the central volume prior to and during inflation.

During a crash event, the inflator fires releases inflation gas which expands the bladder and moves the front trim wall toward the occupant. Managing the pressure within the bladder and the resulting stress applied to the hermetic weld seam in a way that simultaneously obtains the required knee loads is a difficult balancing act. If there is not enough pressure relief within the system then the stress on the weld seam when the bladder becomes loaded by an impact of the occupant's knees may be high enough to blow out the hermetic weld seam, resulting in complete loss of pressure within the system. If there is too much venting within the system, then while the weld seam stays intact the system cannot generate the required knee loads for occupant restraint.

Vents such as star-shaped holes 20 may allow excessive gas leakage upon deployment, resulting in a greater than desired loss of pressure within the system. Thus, it has been difficult to maintain sufficient pressure in order to obtain the knee loads required for good occupant restraint.

In a preferred embodiment of the invention, no molded-in vent holes are created in the bladder walls. Instead, a flash sleeve is provided at the edge of an inflator-receiving hole of the bladder in order to create a snug fit to the inflator when installed. This sleeve maintains an initial seal which allows the bladder to expand and inflate to a high pressure. When the bladder becomes loaded by an impact of the knees, pressure is relieved through a gap that opens up between the inflator and the flash sleeve. The resulting pressure relief experienced by the bladder is directly related to the force acting upon the bladder by the impacting knees. The softness of the bladder material and the thickness of the flash sleeve are selected to provide a desired flexibility so that a self-regulating vent is created having desired pressure characteristics.

Figure 2:
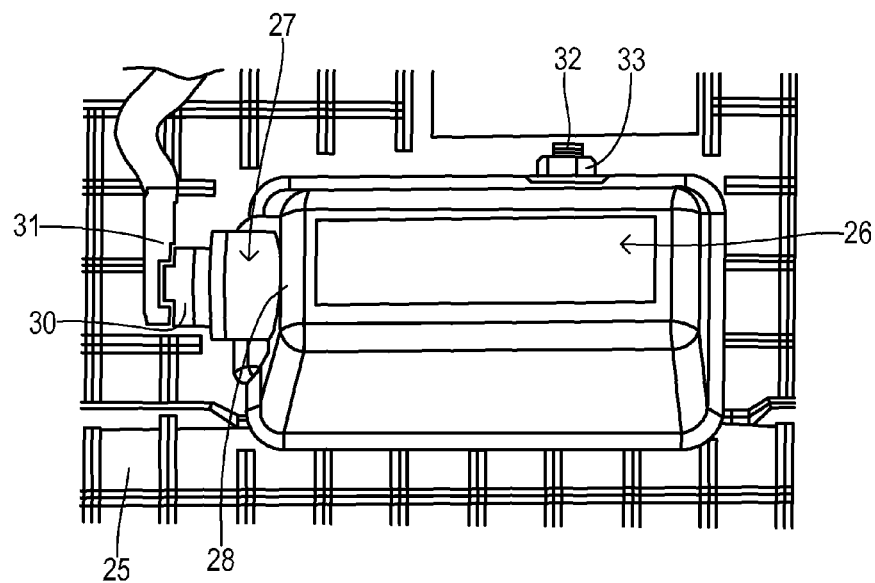
FIG. 2 is a rear, perspective view of a portion of a back bladder wall with an inflator receptacle of the present invention.

FIG. 2 illustrates an embodiment of the invention wherein a plastic-molded back wall 25 (which is joined around a substantially sealed perimeter with a front wall (not shown) to form an inflatable bladder) has an inflator receptacle 26 defined by a raised recess wall. An inflator unit 27 is installed in an inflator aperture 28 formed in the raised recess wall. An electrical connector 30 is coupled to a control module (not shown) via a mating connector and wiring 31. A threaded mounting stud 32 that extends from inflator unit 27 passes through the raised recess wall of receptacle 26 to receive a nut 33 that is tightened sufficiently to obtain a seal against any leakage of inflation gas.

Figure 3:
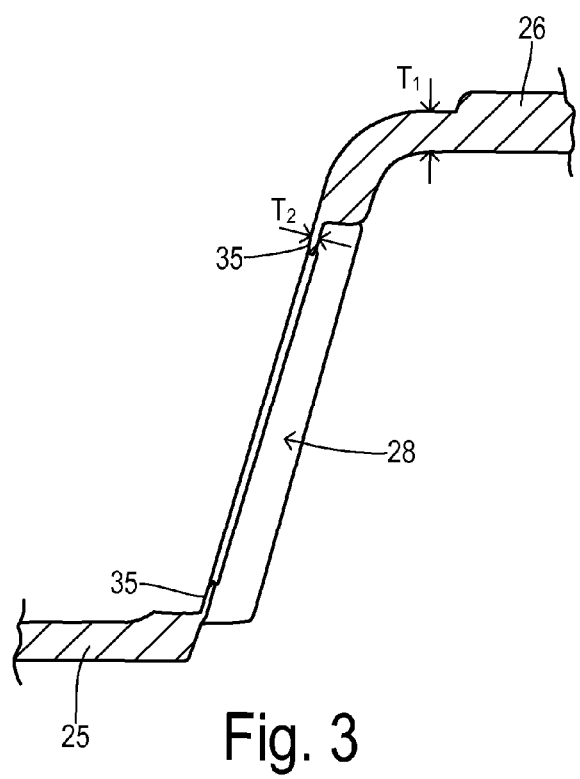
FIG. 3 is a cross section through the inflator receptacle of FIG. 2 without an inflator.

FIG. 3 shows a cross section of receptacle 26 through inflator aperture 28, revealing a flexible seal disposed circumferentially around the inner edge of inflator aperture 28 which is comprised of a flashing edge 35 for bearing against the inflator. More particularly, flashing edge 35 may preferably be formed by a thinning of the wall along the edge of aperture 28 to a thickness $T_2$, compared to a greater thickness $T_1$ of the surrounding portions of receptacle 26. Thickness $T_1$ has a predetermined value which is configured to substantially retain the shape of receptacle 26 during inflation of the bladder. Thickness $T_2$ is less than the predetermined value of $T_1$ so that it has the flexibility necessary to form a variable, self-regulating vent. Due to its flexibility, flashing edge 35 starts to become elastically distended when a predetermined pressure is reached within receptacle 26 after the front wall of the bladder has been deployed during an inflation event. Furthermore, an amount of elastic distention that is obtained is preferably proportional to an amount by which the instantaneous applied pressure exceeds the predetermined pressure.

Figure 4:
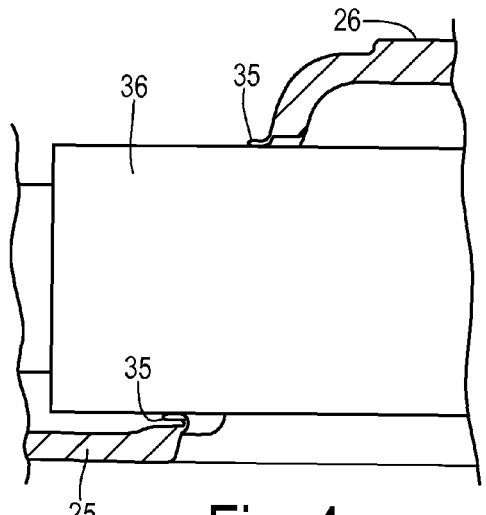
FIG. 4 is a cross section through the inflator receptacle of FIG. 2 with an inflator.

FIG. 4 shows a cylindrical body 36 of inflator 27 after installing it into the inflator aperture so that flashing edge 35 is deflected as a result of the diameter of body 36 being greater than the diameter of the opening created by flashing edge 35. In one embodiment, an inflator was used having a diameter of about 20 mm. The diameter of the aperture without the flashing edge (i.e., where the wall begins to thin) was 21 mm, and the diameter of the aperture within the flashing edge was 18 mm.

Figure 5:
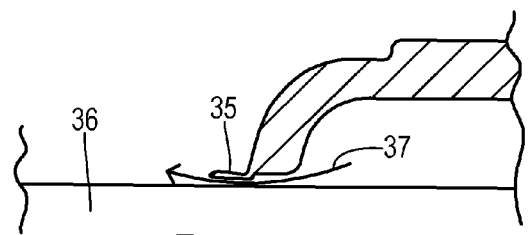
FIG. 5 is a partial cross-sectional view showing the venting of inflation gas at a flexible seal formed around the inflator.

The deflection of flashing edge 35 causes it to bear against inflator body 36 with sufficient force to maintain a seal as long as internal bladder pressure is below the predetermined pressure. When internal pressure increases above the predetermined pressure, flashing edge 35 is elastically distended as shown in FIG. 5 to create a vent path 37. The variable size of path 37 depends on (e.g., is proportional to) the internal pressure.

Figure 6:
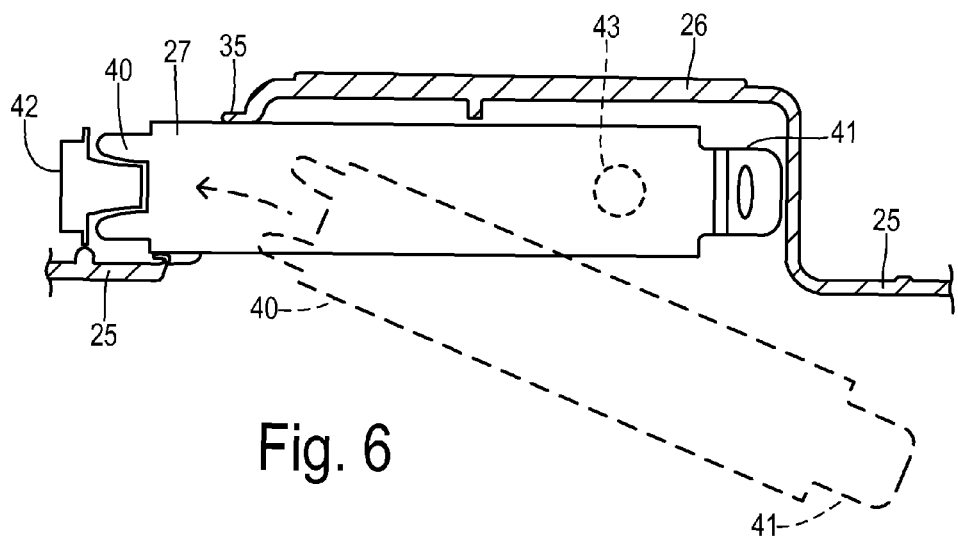
FIG. 6 illustrates the insertion of an inflator into an inflator receptacle to engage the flexible seal.

A preferred method of the mounting of inflator unit 27 into the raised recess of receptacle 26 is shown in FIG. 6. Inflator 27 has an electrical connector end 40 and a gas outlet end 41. From the interior side of back bladder wall 25, connector end 40 is moved from the position shown in dashed lines through the inflator aperture, thereby deflecting flashing edge 35 toward connector end 40 as it moves into its final position shown in solid lines. An electrical plug 42 is then joined with connector end 40 and a mounting stud (not shown) near gas outlet end 41 is inserted through a mounting hole 43 in the side of receptacle 26. A gasket and a nut are threaded onto the stud in order to fasten gas outlet end 41 inside the inflatable bladder.

An inflator receptacle is a feature which would typically be employed in almost any active bolster design for different unique vehicle applications. A self-regulating vent formed by a flashing edge around the outside of the aperture that receives the inflator body provides for easy design and development resulting in low cost and improved results.

What is claimed is:

1. An active bolster for mounting at an interior trim surface of a passenger compartment in an automotive vehicle, comprising:
    a plastic-molded, expandable front wall for deploying toward a passenger in the passenger compartment;
    a plastic-molded back wall joined around a substantially sealed perimeter with the front wall to form an inflatable bladder, wherein the back wall includes an inflator receptacle defined by a raised recess wall having an inflator aperture; and
    an inflator having a gas outlet end and an electrical connector end;
    wherein the inflator is received in the inflator aperture with the gas outlet end inside the inflatable bladder;
    wherein the recess wall has a predetermined thickness for substantially retaining shape during inflation of the bladder; and
    wherein the inflator receptacle includes a flexible seal disposed around an inner edge of the inflator aperture comprised of a flashing edge bearing against the inflator and having a thickness less than the predetermined thickness of the recess wall to form a variable vent.

2. The active bolster of claim 1 wherein the flashing edge is deflected toward the connector end by the inflator.

3. The active bolster of claim 1 wherein the flashing edge is elastically distended in response to a predetermined pressure when the front wall is deployed.

4. The active bolster of claim 3 wherein the elastic distension is proportional to an applied pressure greater than the predetermined pressure.

5. The active bolster of claim 1 wherein the inflator comprises a fastener disposed at the gas outlet end that is fastened to the recess wall.

6. An active bolster comprising:
   front and back walls joined around a periphery defining an inflatable cavity; and
   an inflator having a substantially cylindrical body;
   wherein the inflator body is inserted through an aperture in the back wall, wherein the aperture includes a flexible seal disposed around an inner edge comprised of a flashing edge bearing against the inflator that elastically distends and vents in response to a predetermined pressure in the cavity.

7. The active bolster of claim 6 wherein the flashing edge is deflected away from the cavity by the inflator.

8. The active bolster of claim 6 wherein the elastic distension is proportional to an applied pressure greater than the predetermined pressure.

9. The active bolster of claim 6 wherein the inflator comprises a fastener disposed at the gas outlet end that is fastened to the back wall.

\* \* \* \* \*